Dec. 25, 1962 V. C. WEBB 3,070,055
REVERSIBLE DIE FOR FORMING BLOWER HOUSINGS
Filed March 16, 1959 2 Sheets-Sheet 1

INVENTOR.
Venard C. Webb
BY
ATTORNEY.

Dec. 25, 1962 V. C. WEBB 3,070,055
REVERSIBLE DIE FOR FORMING BLOWER HOUSINGS
Filed March 16, 1959 2 Sheets-Sheet 2

INVENTOR.
Venard C. Webb
BY
ATTORNEY.

United States Patent Office 3,070,055
Patented Dec. 25, 1962

3,070,055
REVERSIBLE DIE FOR FORMING BLOWER
HOUSINGS
Venard C. Webb, Salina, Kans., assignor to Grain Belt
Supply Co., Inc., a corporation of Kansas
Filed Mar. 16, 1959, Ser. No. 799,639
2 Claims. (Cl. 113—46)

This invention relates to sheet metal equipment and has for its primary object to provide a die assembly adapted to be utilized with conventional press apparatus and having novel components permitting forming of right and left-hand articles from sheet material, of irregular peripheral configuration, by the simple expedient of merely reversing certain of the components of the die assembly, with all of such components being employed in the forming operation regardless of whether right or left-hand articles are being produced.

Another important object of the invention is to provide a die assembly as referred to above including parts adapted to be mounted on the bed and reciprocable ram respectively of a conventional press without modification of the latter being necessary in order to form either right or left-hand articles as required in subsequent assembly operations.

It is to be understood that in the fabrication of many products from sheet metal, many of the subassembly components are substantially identical except for the fact that certain parts are mirror images of other members. Economies in manufacturing can be accomplished, therefore, if means is provided for forming the parts which are mirror images of each other employing the same die elements in the production of either of the mirror image articles defined above. For example, opposed major components of a blower housing normally comprise a pair of formed metal sheets which are mirror images of each other and suitably interconnected by a ring-like intermediate panel welded to opposed peripheral edges of the formed panels.

It is, therefore, a further important object of the invention to provide a die assembly adapted for forming sheet metal, of irregular peripheral configuration such as blower housing panels, and capable of producing mirror image articles or panels without modification of the press or the die assembly.

A still further important object of the invention is to provide a die assembly of the aforementioned character wherein the components thereof may be reversed to produce a formed article constituting a mirror image of the initially produced article, in a minimum of time, with relatively unskilled labor and without the necessity of employing precision adjustment tools.

Other important objects of the invention relate to the provision of a die assembly having novel structure for maintaining the sheet metal to be formed in proper position during reciproation of the forming member and which may be utilized with equal facility regardless of whether a right or left-hand article is being produced; to improved stop structure constituting a part of the die assembly and disposed to be engaged by each of the sheets to be formed when the same is placed between the die member and the forming member, whereby a relatively large number of such sheets may be formed in a minimum of time because of the elimination of time consuming and costly procedures involving alignment of the metal sheets with the forming member and the die member; to adjustable structure adapted to be mounted on the press bed in positions to maintain the die member in correct alignment with the reciprocable forming member; to a die assembly having simple and effective components which are resistant to wear and thereby have a long useful life; and to other important objects and details of the present reversible die assembly which will become obvious or be explained more fully as the following specification progresses.

Figure 7:
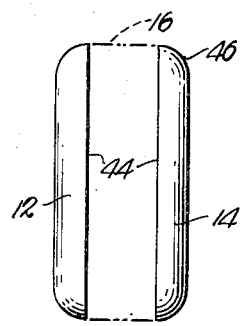
FIG. 7 is an end elevational view of the main blower housing panels shown in FIGS. 5 and 6 and illustrating the normal disposition thereof when interconnected by an intermediate member indicated by dotted lines therebetween.

For illustrative purposes only, the reversible die assembly broadly numerated 10 in the drawings is shown with components adapted for forming either left or right-hand blower housing panels 12 and 14 respectively, with panel 12 constituting substantially a mirror image of panel 14. As illustrated in FIG. 7, opposed peripheral margins of panels 12 and 14 are adapted to be interconnected by an intermediate member 16 while panel 14 may have a central opening 18 constituting the inlet of the housing and receiving the fan shaft or motor shaft upon final assembly of the blower.

Die assembly 10 is especially adapted to be mounted on a conventional press utilized for sheet metal forming operations and thereby including a normally horizontal bed 20 and a reciprocable ram 22 mounted on the press for movement vertically toward and away from bed 20. Flange 24 on the normally lowermost end of ram 22 facilitates mounting of a forming member constituting a part of die assembly 10, as will be described in greater detail hereinafter.

The basic components of die assembly 10 comprise a die member 26, a draw ring 28 and a forming member 30. Die member 26, which may be substantially rectangular in shape, preferably constitutes a relatively flat, plate-like element having a pair of opposed, parallel, major faces 32 and 34 and a rectangular peripheral edge 36.

Since it is desired that die assembly 10 be employed to produce formed blower housing panels such as 12 or 14, die member 26 is provided with a central opening 38 substantially conforming in configuration to the final shape of panels 12 and 14. It is to be understood that opening 38 extends entirely through die member 26 and that the inner, continuous surface 40 of die member 26 defining opening 38, is substantially perpendicular to opposed faces 32 and 34.

Draw ring 28 is adapted to be removably mounted on die member 26 in overlying relationship thereto and is constructed to maintain metal blank 42 in proper alignment with opening 38 during the forming operation.

Figure 1:
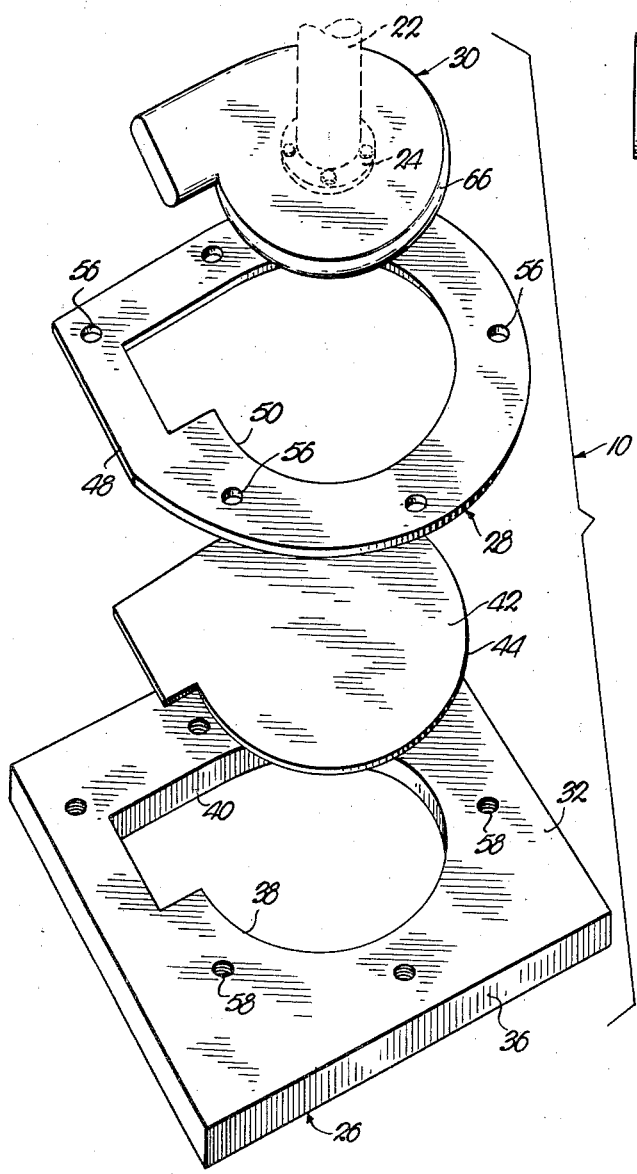
FIGURE 1 is an exploded perspective view of the die assembly embodying the concepts of the present invention.
Figure 5:
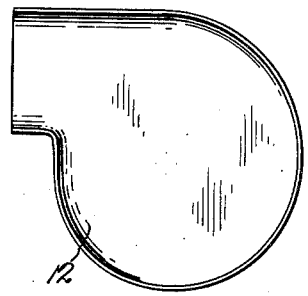
FIG. 5 is a side elevational view of one main panel of a blower housing which may be produced with the instant reversible die assembly.
Figure 6:
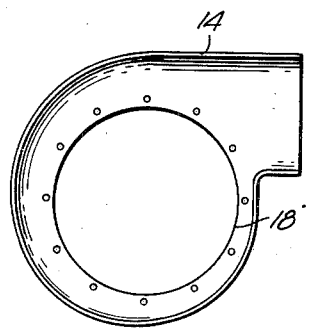
FIG. 6 is a side elevational view of the other main panel of a blower housing and constituting a mirror image of the panel illustrated in FIG. 5.
Figure 2:
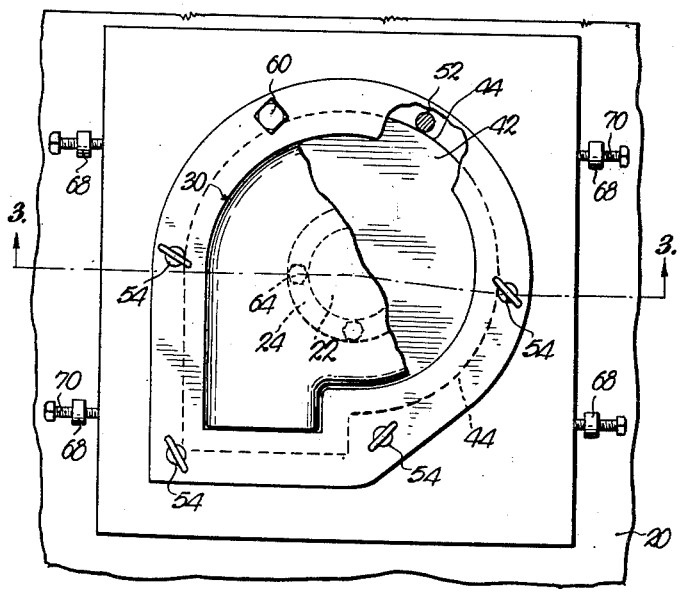
FIG. 2 is a fragmentary plan view of the die assembly illustrated in FIG. 1 and with the die member disposed on the bed of a press, and certain parts of the assembly being broken away and in section to reveal details of construction thereof.

As indicated in FIGS. 1 and 2, the peripheral margin 44 of sheet blank 42 substantially conforms to the final configuration of panels 12 and 14 with the purpose of the forming operation being to bend margin 44 of blank 42 laterally and with a uniform degree of curvature, as shown in FIG. 7. The overall appearance of the final blower is materially improved by bending margin 44 of each panel blank 42 to present respective radii 46 and furthermore, final assembly of the blower housing is facilitated by virtue of the fact that an initially flat, elongated sheet of material may be welded to opposed edges 44 of panels 12 and 14 to thereby present the final housing.

Figure 4:
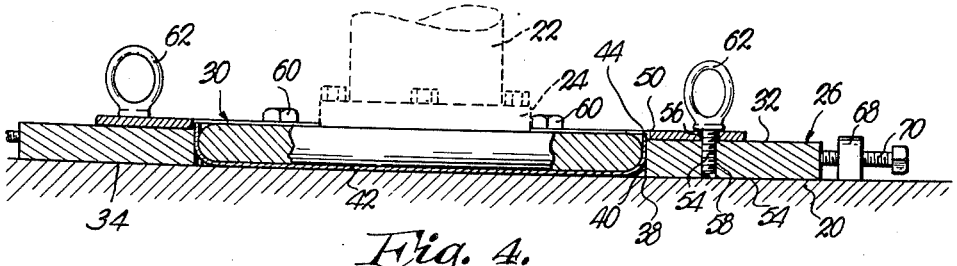
FIG. 4 is likewise a fragmentary, enlarged, vertical, cross-sectional view similar to FIG. 3 and showing the forming member at the lowermost end of its path of travel in proximal relationship to the press bed.

Draw ring 28, which has an outer, irregularly shaped peripheral edge 48 of substantially greater dimensions than those of opening 38 but less than the dimensions of die member 26, is provided with a central perforation 50 substantially conforming to the configuration of opening 38. It is to be preferred that perforation 50 be complemental with opening 38 and of very slightly greater size, as shown in FIG. 4.

Fastening means for releasably securing draw ring 28 to either face 32 or 34 of die member 26, includes a pair of primary fastening bolts 52 and a series of secondary fastening bolts 54, likewise disposed in surrounding relationship to opening 38 and perforation 50. Draw ring 28 has a series of spaced apertures 56 receiving respective bolts 52 and 54, with each of the fastening bolts 52 and 54 being externally threaded and adapted to be complementally threaded into corresponding, internally threaded passages 58 extending completely through die member 26. Heads 60 of bolts 52 are conventional in character in that the same are rectangular or hexagonal in configuration, whereas the ring-like heads 62 integral with the uppermost ends of each of the bolts 54 are adapted to facilitate rotation of bolts 54 within respective passages 58. It is also to be understood that fastening bolts 52 have enlarged, non-threaded portions (not shown), adjacent respective heads 60 and adapted to engage the major face of die member 26 proximal to heads 60, when fastening bolts 52 are threaded into corresponding passages 58 to thereby limit movement of heads 60 toward draw ring 28 and thereby, die member 26. The function of the shoulders on fastening bolts 52 will become clear hereinafter.

Although all of the fastening bolts 52 and 54 are of the same size and likewise, passages 58 of equal diameter, it is particularly contemplated that fastening bolts 52 be threaded into corresponding passages 58 adjacent one edge segment of die member 26 and preferably the segment normally located at the rearmost portion of bed 20 when the operator is running the press. The remaining fastening bolts 54 are disposed in the other passages 58 and in this connection, it is to be noted that fastening bolts 54 are disposed at strategic points around perforation 50 and thereby opening 38 to force blank 42 into tight engagement with the uppermost face of die member 26 and which constitutes face 32 in FIG. 3. It should also be noted that draw ring 28 is preferably constructed of sufficiently flexible material to permit the inner edge of draw ring 28 defining perforation 50 to flex relative to the outer peripheral margin of draw ring 28, whereby such outer margin may be moved into engagement with a proximal major face of die member 26 when fastening bolts 54 are rotated in a direction to cause lower parts of heads 62 to shift draw ring 28 into engagement with die member 26. As illustrated in FIG. 2, fastening bolts 52 and 54 are also positioned to cause blank 42 to be disposed in direct alignment with opening 38 and perforation 50 when such blank engages fastening bolts 52 and the proximal fastening bolts 54 on each side thereof.

Forming member 30 which is adapted to be secured to flange 24 of ram 22 by stud bolts 64, also has a peripheral margin substantially conforming to the configuration of opening 38 and perforation 50 and is of dimensions less than those of opening 38 equal to the thickness of blank 42. Forming member 30 is preferably at least as thick as die member 26 and the peripheral margin 66 thereof, and alluded to above, is convex in transverse cross-section with the radius thereof equal to the desired radii 46 which are to be formed into blank 42 to produce panels 12 and 14. Forming member 30 is adapted to be removably secured to ram 22 in a position to be received within opening 38 and perforation 50 of die member 26 and draw ring 28 respectively as ram 22 is reciprocated toward bed 20.

Means for adjustably maintaining die member 26 in proper position on bed 20 preferably includes a plurality of supports 68 adapted to be rigidly secured to the upper surface of bed 20 on opposed sides of die member 26 and each mounting an adjustment screw 70 for horizontal movement toward and away from die member 26. Adjustment screws 70 are moved into firm engagement with a corresponding edge segment of die member 26, whereupon the position of the same relative to ram 22 and thereby forming member 30 may be changed as desired.

In operation, die plate 26 is placed on bed 20 with the face 32 or 34 thereof facing upwardly, depending upon whether a panel 12 or 14 is to be formed, and adjustment screws 70 are rotated in a direction to cause the innermost ends thereof to move into firm engagement with proximal edge segments of die member 26. Next, forming member 30 is secured to flange 24 of ram 22 by stud bolts 64, with forming member 30 positioned so as to be complementally received within opening 38 and perforation 50 of die member 26 and draw ring 28 respectively as ram 22 is reciprocated toward bed 20. It is to be preferred that ram 22 be shifted toward bed 20 to move forming member 30 into opening 38 defined by surface 40 prior to forming one of the blanks 42 into a blower housing panel, in order to determine whether or not die member 26 is located in correct disposition relative to forming member 30. As pointed out above, adjustment of die member 26 is effected by rotating adjustment screws 70 carried by corresponding supports 68.

Figure 3:
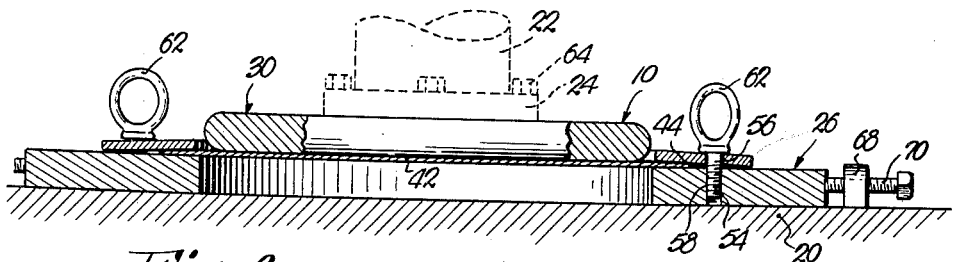
FIG. 3 is a fragmentary, enlarged, vertical, cross-sectional view taken substantially on the line 3—3 of FIG. 2 and with the forming member located at its initial point of engagement with the sheet to be formed.

Draw ring 28 is then placed over die member 26 and fastening bolts 52 are threaded into respective passages 58 at the end of die member 26 normally proximal to the rearmost section of bed 20. Fastening bolts 52 are threaded into passages 58 until the shoulders referred to above engage a proximal face of die member 26. As illustrated in FIGS. 3 and 4, the shoulders on fastening bolts 52 would engage major face 32 of die member 26.

A sheet metal blank 42 is then slipped between draw ring 28 and die member 26 and moved toward the rear portion of the press until the margin 44 of blank 42 engages stops or fastening bolts 52. Thereupon, secondary fastening bolts 54 are threaded into corresponding passages 58 to bias draw ring 28 toward die member 26 and thereby force blank 42 into tight engagement with face 32 of die member 26.

Upon reciprocation of ram 22 toward bed 20, forming member 30 is initially moved into engagement with blank 42 directly above perforation 50 and opening 38, whereupon continued movement of such forming member 30 toward bed 20 causes the peripheral margin 44 of blank 42 to be deformed, as best shown in FIG. 4.

The formed panel 12 or 14 may then be readily removed from opening 38 defined by surface 40, whereupon another blank 42 may be slipped between draw ring 28 and die member 26 after loosening of secondary fastening bolts 54 or removal of the same from passages 58. Upon engagement of the second panel 42 with stop or fastening bolts 52, tightening of fastening bolts 54 maintains the second blank 42 in a position whereby, upon reciprocation of ram 22 and thereby forming member 30 toward bed 20, another panel 12 or 14 is formed as described above. This operation may be continued until a desired number of such panels have been suitably formed.

When it is desired to produce another panel of suitable configuration and constituting a mirror image of the panel referred to above, it is merely necessary to turn die member 26 over so that the face 34 thereof is facing upwardly and to reverse forming member 30 on the lower end of ram 22, with such forming member 30 again disposed in a position to be complementally received within opening 38. Since passages 58 extend completely through die member 26, fastening bolts 52 and 54 may again be threaded into corresponding passages to retain blanks 42 in proper disposition for forming.

Not only is reversible die assembly 10 simple in construction and thereby marketable at a relatively low cost, but the components have a long useful life and may be employed to form sheet metal blanks into either left or right-hand articles constituting mirror images of each other, without modification of the components of the assembly or utilizing elements which have utility only in the production of one type of panel.

Although reversible die assembly 10 has been described in detail as being adapted for forming blower housing panels such as 12 and 14, it is to be understood that the principles disclosed herein may be employed to equal advantage in the formation of various other types of formed articles. For this reason, it is intended that the present invention be limited only by the scope of the appended claims.

Having thus described the invention what is claimed as new and desired to be secured by Letters Patent is:

1. In a reversible die assembly for forming an article of manufacture, a relatively flat, plate-like die member having a pair of opposed faces and a central opening therethrough of irregular peripheral configuration, said die member being adapted to be mounted on a press with one of said faces thereof in engagement with the bed of the press and the opening thereof in alignment with the ram of the press; stop means on said die member for engaging a sheet to be formed to dispose the latter in substantial alignment with the opening of said die member; a relatively flexible draw ring disposed on the die member in engagement with the other of said faces of the latter for maintaining the sheet to be formed in direct alignment with said opening, said draw ring being provided with a perforation therein defining an inner peripheral margin conforming to the configuration of said opening; fastening means disposed between the inner and outer peripheral margins of said draw ring releasably securing the draw ring to said die member to hold the outer peripheral margin thereof in engagement with the die member when the inner peripheral margin thereof is in engagement with said sheet; and a forming member of a thickness at least equal to that of the die member and having a pair of opposed surfaces and a peripheral configuration substantially conforming to the configuration of said opening, said forming member having means to selectively secure either of the surfaces thereof to the ram of the press, the other surface of said forming member being adapted to engage the sheet to cause the latter to be complementally received in said opening in the die member as the ram is reciprocated toward the bed, whereby a right-hand article may be formed from said sheet when said one face of the die member and said one surface of the forming member engage the bed and ram, respectively, and a left-hand article may be formed when the other of said faces of the die member and the other of said surfaces of the forming member engage the bed and ram, respectively.

2. An assembly as set forth in claim 1, wherein said stop means and the fastening means include externally threaded elements extending through corresponding apertures in the draw ring and releasably received in respective, complementally threaded passages in the die member.

References Cited in the file of this patent

UNITED STATES PATENTS

| | | |
|---|---|---|
| 145,412 | Gordon | Dec. 9, 1873 |
| 430,816 | Webster | June 24, 1890 |
| 921,974 | Ginsburg | May 18, 1909 |
| 1,033,209 | Stucki | July 23, 1912 |
| 1,143,055 | Mandeville | June 15, 1915 |
| 2,321,075 | Frey et al. | June 8, 1943 |
| 2,324,205 | Geldfelter et al. | July 13, 1943 |
| 2,348,998 | Pease | May 16, 1944 |
| 2,440,845 | Cairns | May 8, 1948 |
| 2,649,067 | Kranenberg | Aug. 18, 1953 |